US009516644B2

(12) United States Patent
Pan et al.

(10) Patent No.: US 9,516,644 B2
(45) Date of Patent: Dec. 6, 2016

(54) METHOD FOR RESOURCE ALLOCATION OF BACKHAUL LINK CONTROL CHANNEL INFORMATION AND DEVICE THEREFOR

(75) Inventors: Xueming Pan, Beijing (CN); Keke Liu, Beijing (CN); Zukang Shen, Beijing (CN); Libo Wang, Beijing (CN); Guojun Xiao, Beijing (CN)

(73) Assignee: China Academy Of Telecommunications Technology, Beijing (CN)

( * ) Notice: Subject to any disclaimer, the term of this patent is extended or adjusted under 35 U.S.C. 154(b) by 387 days.

(21) Appl. No.: 13/703,627

(22) PCT Filed: May 31, 2011

(86) PCT No.: PCT/CN2011/074990
§ 371 (c)(1),
(2), (4) Date: Feb. 28, 2013

(87) PCT Pub. No.: WO2011/160536
PCT Pub. Date: Dec. 29, 2011

(65) Prior Publication Data
US 2013/0208669 A1 Aug. 15, 2013

(30) Foreign Application Priority Data
Jun. 25, 2010 (CN) .......................... 2010 1 0218479

(51) Int. Cl.
H04W 72/04 (2009.01)
H04L 5/00 (2006.01)
H04W 84/04 (2009.01)

(52) U.S. Cl.
CPC .......... *H04W 72/044* (2013.01); *H04L 5/0048* (2013.01); *H04W 84/047* (2013.01)

(58) Field of Classification Search
None
See application file for complete search history.

(56) References Cited

U.S. PATENT DOCUMENTS

2008/0232495 A1 9/2008 Yu et al.
2010/0086064 A1* 4/2010 Jianming et al. ............. 375/259

(Continued)

FOREIGN PATENT DOCUMENTS

CN 101222272 A 7/2008
CN 101534265 A 9/2009

(Continued)

OTHER PUBLICATIONS

ISR for related PCT/CN2011/074990 mailed on Aug. 11, 2011.

(Continued)

*Primary Examiner* — Rhonda Murphy
(74) *Attorney, Agent, or Firm* — Ladas & Parry LLP

(57) ABSTRACT

The embodiments of the present invention relate to a method for resource allocation of backhaul link control channel information and a device therefor. Upon application of technical solutions proposed by embodiments of the present invention and based on the condition of introducing the DMRS and CSI-RS, remaining REs which are not occupied by the CSI-RS and/or the DM-RS in an OFDM symbol is configured to constitute an REG, which is used to transmit or discard the backhaul link control channel information. Thus without much improvement on the existing LTE system specification, a resource allocation scheme of the backhaul link control channel information in corresponding physical resource blocks has been proposed, which accommodates for both simple specification design and full utilization on resources, and realizes flexible design and allocation in light of demands of the real system.

8 Claims, 12 Drawing Sheets

(56) References Cited

U.S. PATENT DOCUMENTS

2012/0207084 A1* 8/2012 Seo et al. .................. 370/315
2012/0250642 A1* 10/2012 Qu ..................... H04W 48/12
            370/329
2015/0055548 A1* 2/2015 Seo ................... H04W 72/0426
            370/315

FOREIGN PATENT DOCUMENTS

| CN | 101697535 A | 4/2010 |
|----|-------------|--------|
| WO | 2008/118810 A1 | 10/2008 |
| WO | 2008/133415 | 11/2008 |
| WO | 2010/068047 A2 | 6/2010 |

OTHER PUBLICATIONS

3GPP TSG RAN WG1 Meeting #59, Nov. 13, 2009, Samsung (will be filed in a supplemental IDS at a later date).

Office action dated Jul. 1, 2013 from corresponding Chinese Patent Application No. 2010102184798 along with its English translation by the applicants.

Office action dated Apr. 22, 2014 from corresponding Korean Patent Application No. 10-2012-7024438 along with its English translation by the applicants.

IPRP/WO for related PCT/CN2011/074990 dated Dec. 28, 2012 and its English translation.

* cited by examiner

METHOD FOR RESOURCE ALLOCATION OF BACKHAUL LINK CONTROL CHANNEL INFORMATION AND DEVICE THEREFOR

This application claims the priority to the Chinese Patent Application No. 201010218479.8, titled "METHOD FOR RESOURCE ALLOCATION OF BACKHAUL LINK CONTROL CHANNEL INFORMATION AND DEVICE THEREFOR" filed with Patent Office of the People's Republic of China on Jun. 25, 2010, the entire disclosure of which is incorporated by reference herein.

FIELD OF THE INVENTION

The present invention relates to the field of communication technology, in particular to a method for resource allocation of backhaul link control channel information and a device therefor.

BACKGROUND OF THE INVENTION

A network structure diagram of a Long Term Evolution Advanced (LTE-A) system is shown in FIG. 1, where an evolved Node B (eNB) is connected to a Core Net (CN) through wired interface, a Relay Node (RN) is connected to the eNB through wireless interface, and User Equipment (UE) is connected to the RN or the eNB through wireless interface.

Generally, there are two kinds of pilot signals in a Long Term Evolution (LTE) system (i.e., Release 8 generally mentioned), namely, a Reference Signal (RS) includes a Common Reference Signal (CRS) and a Dedicated Reference Signal (DRS).

The CRSs are sent by full band with specific configuration related to its Identity (ID) of one cell, that is, within one cell, modes of the CRSs are the same. A control channel, i.e., a Physical Downlink Control Channel (PDCCH) can only be demodulated by the CRSs, for the PDCCH is detected by several users simultaneously, and its pilot signal is supposed to be visible to all users and be identical.

The LTE-A system introduces a Demodulation Reference Signal (DM-RS) for user's data demodulation and a Channel State Information Reference Signal (CSI-RS) for UE reporting Channel Quality Indication (CQI)/Precoding Matrix Indicator (PMI)/Rank Indication (RI). Actually, DM-RS is very similar to dedicated user pilot signal of LTE system, and the difference mainly lies in that DM-RS supports the transmission of multi-data stream through multiple ports while dedicated user pilot signal of LTE system only supports the transmission of single-data stream through a single port. However, as time division duplex mode of RN needs to occupy OFDM (Orthogonal Frequency Division Multiplexing) symbol as transceiving handover time, which results in that the last OFDM symbol of backhaul subframe cannot be used. Therefore some proposals suggest using shifted DMRS patterns. However the CSI-RS generally refers to exclusive pilot signal of a cell. Presently, LTE-A has not yet determined pilot pattern of the CSI-RS which has two alternative schemes: Code Division Multiplexing across Time (CDMT) and Code Division Multiplexing across Frequency (CDMF), with specific positions for pilot signals being not determined either.

In relaying backhaul, as the last OFDM symbol of each subframe is to be used as transceiving handover time of the RN, it cannot be used in backhaul transmission. Therefore two revised DMRS transmission schemes have been proposed at present, namely, shifted DMRS pattern and punctured DMRS pattern, so as to prevent the DMRS from occupying in the last OFDM symbol. The four-port CRS and shifted DMRS pilot pattern in the related art are shown in FIG. 2, while the four-port CRS and punctured DMRS pilot pattern in the related art are shown in FIG. 3.

For In-band relay, the backhaul link shares band resource with an eNB-macro UE link, so its control channel R-PDCCH fails to conform to specifications of original R8 and needs to be modified. Currently, after the discussion of 3GPP RAN1 standard conference, the following conclusions have been reached for the design of R-PDCCH: an eNB is to send the R-PDCCH starting from the fourth symbol. Specifically a Downlink grant is sent within the first timeslot and an Uplink grant is sent within the second timeslot. Multiplexing modes for R-PDSCH, R-PDCCH, PDSCH and PDCCH are shown in FIG. 4.

In the course of implementing embodiments of the present invention, the inventors found out that there are at least the problems below in the related art:

In the current LTE-A system, there is no specific scheme for controlling resource allocation when the CSI-RS and the DM-RS exist in the R-PDCCH.

SUMMARY OF THE INVENTION

The embodiments of the present invention provide a method for resource allocation of backhaul link control channel information and a device therefor, and put forward a configuration scheme of Physical Downlink Control Channel (R-PDCCH) resource in the circumstances of introducing Demodulation Reference Signals (DMRS) and Channel State Information Reference Signals (CSI-RS).

To achieve the above purposes, in an aspect of the embodiments of the present invention, a method for resource allocation of backhaul link control channel information is provided, which may include the following steps:

configuring remaining Resource Elements (REs) which are not occupied by a CSI-RS and/or a DM-RS in an Orthogonal Frequency Division Multiplexing (OFDM) symbol, by a sending terminal equipment for sending the backhaul link control channel information, as a Resource Element Group (REG), wherein the OFDM symbol contains REs for transmitting the CSI-RS and/or the DM-RS in a physical resource block; and discarding the remaining REs which do not constitute the REG in the OFDM symbol, by the sending terminal equipment for sending the backhaul link control channel information, and transmitting the backhaul link control channel information through the REG or discarding the REG.

In another aspect of the embodiments of the present invention, provide a sending terminal equipment for transmitting backhaul link control channel information is provided, which may include:

a configuring module, which is used to configure remaining REs which are not occupied by a CSI-RS and/or a DM-RS in an OFDM symbol as an REG, wherein the OFDM symbol contains REs for transmitting the CSI-RS and/or the DM-RS in a physical resource block; and a processing module, which is used to discard the remaining REs which do not constitute the REG in the OFDM symbol, and transmit the backhaul link control channel information through the REG or discarding the REG constituted by the configuring module.

In yet another aspect of the embodiments of the present invention, a method for resource allocation of backhaul link control channel information is provided, which may include the following steps:

identifying an REG in an OFDM symbol, by a receiving terminal equipment for receiving the backhaul link control channel information, wherein the OFDM symbol contains REs for transmitting a CSI-RS and/or a DM-RS in a physical resource block; and discarding receiving the backhaul link control channel information through the remaining REs which do not constitute the REG in the OFDM symbol, by the receiving terminal equipment for receiving the backhaul link control channel information, and receiving the backhaul link control channel information through the REG or discarding receiving the backhaul link control channel information through the REG.

In still yet another aspect of the embodiments of the present invention, a receiving terminal equipment for receiving backhaul link control channel information is provided, which may include:

an identifying module, which is used to identify an REG in an OFDM symbol, wherein the OFDM symbol contains REs for transmitting a CSI-RS and/or a DM-RS in a physical resource block; and a processing module, which is used to discard receiving the backhaul link control channel information through the remaining REs which do not constitute the REG in the OFDM symbol and receive the backhaul link control channel information through the REG or discard receiving the backhaul link control channel information through the REG. identified by the identifying module.

Compared with related arts, the embodiments of the present invention have the following advantages:

Upon application of technical solutions proposed by embodiments of the present invention and based on the condition of introducing the DMRS and CSI-RS, remaining REs which are not occupied by the CSI-RS and/or the DM-RS in an OFDM symbol is configured to constitute an REG, which is used to transmit or discard the backhaul link control channel information. Thus without much improvement on the existing LTE system specification, a resource allocation scheme of the backhaul link control channel information in corresponding physical resource blocks has been proposed, which accommodates for both simple specification design and full utilization on resources, and realizes flexible design and allocation in light of demands of the real system.

BRIEF DESCRIPTION OF THE DRAWINGS

To further explain the technical solutions of the embodiments of the present invention or the related art, the drawings required by the embodiments or the existing technical description will be briefly introduced below. Obviously, the following described drawings only refer to some embodiments of the present invention. Common technical personnel of the field can obtain other drawings according to these drawings without contributing creative work.

DETAILED DESCRIPTION OF PREFERRED EMBODIMENTS

The technical solutions of the embodiments of the present invention will be described clearly and completely in combination with the drawings. Apparently, the described embodiments are only a part of the embodiments of the present invention. Other embodiments based on the embodiments of the present invention obtained by common technical personnel of the field without contributing creative work shall be protected by the present invention.

In an LTE-A system (generally referred to as Release 10), relay nodes (RNs) are introduced to improve system throughput and increase network coverage. The link between an RN and an eNB is called as a backhaul link. On the backhaul link, the eNB uses a special control channel, i.e., R-PDCCH to transmit relevant control signaling to the RN. There is always DMRS pilot signal position with more than two ports within an R-PDCCH area; meanwhile a CSI-RS may also exist.

Under such circumstance, it is impossible to map all available areas of the R-PDCCH into a Resource Element Group (REG) in accordance with the mapping scheme of original Release 8. Technical solutions in the embodiments of the present invention proposes certain specific resource allocation methods for the R-PDCCH under such circumstance, to simplify specification design and conduct flexible design and configuration of relay link control channel in accordance with actual system requirements.

Figure 1:
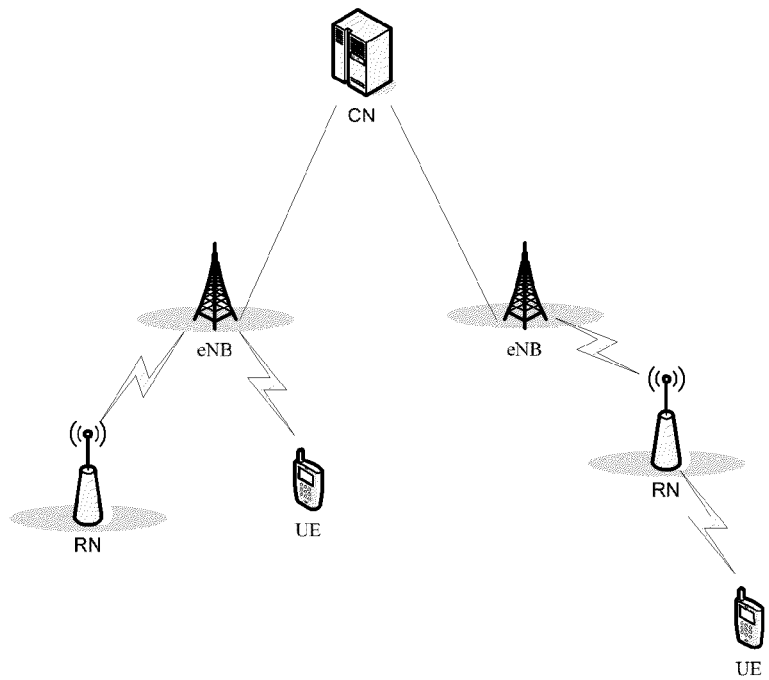
FIG. 1 is a network structure diagram of an LTE-A system in the related art.
Figure 2:
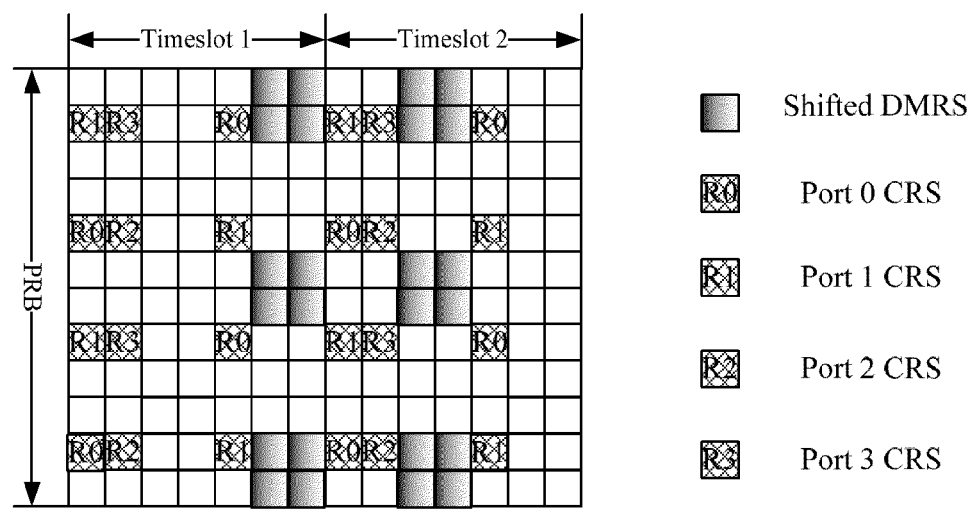
FIG. 2 is a diagram of a four-port CRS and shifted DMRS pilot pattern in the related art.
Figure 3:
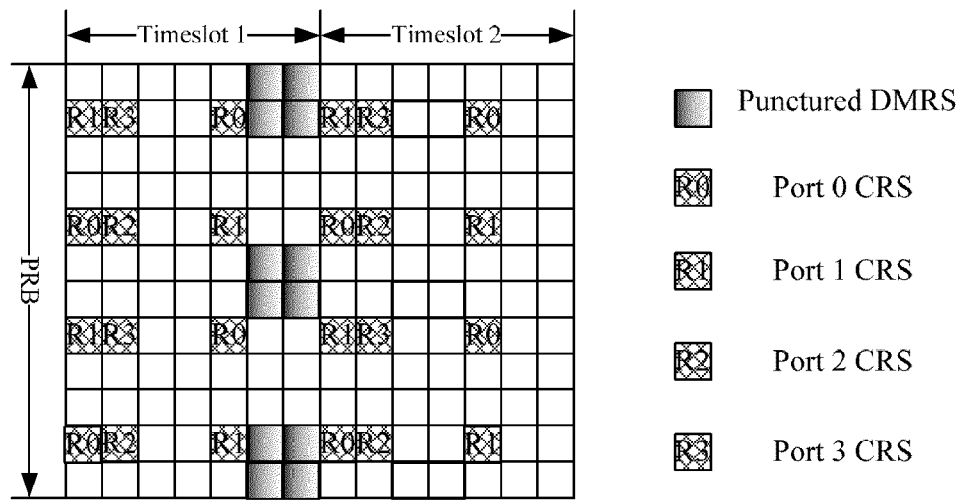
FIG. 3 is a diagram of a four-port CRS and punctured DMRS pilot pattern in the related art.
Figure 4:
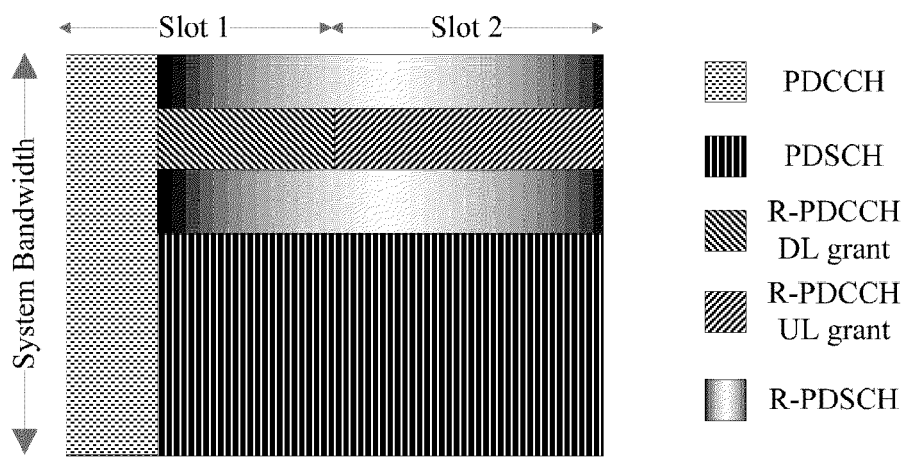
FIG. 4 is a diagram of multiplexing modes for R-PDSCH, R-PDCCH, PDSCH and PDCCH in the related art.
Figure 5:
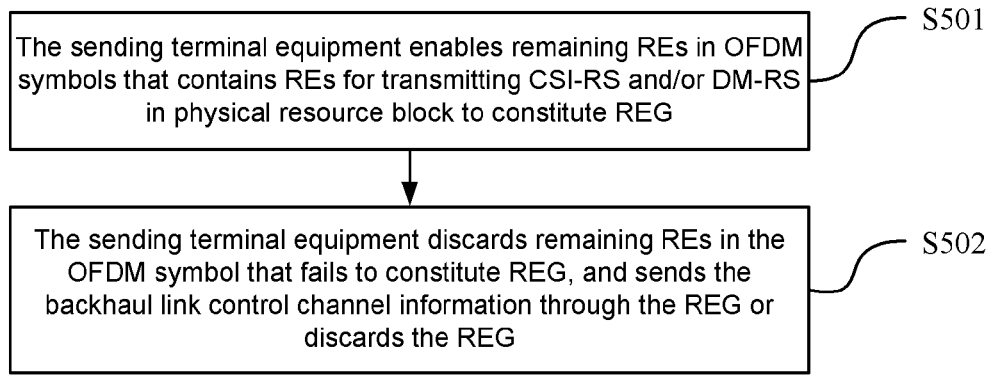
FIG. 5 is a flow chart of a resource allocation method for backhaul link control channel information provided by the embodiments of the present invention at the sending terminal.

As shown in FIG. 5, it is a flow chart for a resource allocation method of backhaul link control channel information provided by the embodiments of the present invention, may include the following steps:

Step S501: A sending terminal equipment for sending the backhaul link control channel information configures remaining Resource Elements (REs) which are not occupied by a Channel State Information Reference Signal (CSI-RS) and/or a Demodulation Reference Signal (DM-RS) in an Orthogonal Frequency Division Multiplexing (OFDM) symbol as a Resource Element Group (REG), wherein the OFDM symbol contains REs for transmitting the CSI-RS and/or the DM-RS in a physical resource block.

In specific applications, the scheme for constituting the REG in the above step includes a combination of two or more schemes as below:

Scheme I: The sending terminal equipment for sending the backhaul link control channel information configures remaining REs in one OFDM symbol as the REG, wherein the OFDM symbol that is contained in a physical resource block only includes REs for transmitting the CSI-RS. According to a number of remaining REs in the OFDM symbol, the above scheme further includes the following two cases:

(1) The sending terminal equipment configures every four remaining REs as one REG, and determining other remaining REs as REs which do not constitute the REG, when one physical resource block only contains the REs for transmitting the CSI-RS and a number of remaining REs in one OFDM symbol within neighboring OFDM symbols which does not contain the REs for transmitting the CSI-RS is larger than four.

(2) The sending terminal equipment configures entirely remaining REs in one OFDM symbol as REs which do not constitute the REG in the OFDM symbol, when one physical resource block only contains the REs for transmitting the CSI-RS and a number of REs in the OFDM symbol within neighboring OFDM symbols which does not contain the REs for transmitting the CSI-RS is smaller than four.

Scheme II: The sending terminal equipment for sending the backhaul link control channel information configures remaining REs in two neighboring OFDM symbols as the REG, wherein the two neighboring OFDM symbols that are contained in the physical resource block include REs for transmitting the CSI-RS and/or the DM-RS. According to a number of remaining REs in the OFDM symbols, the above scheme further includes the following three cases:

(1) The sending terminal equipment configures every four REs in OFDM symbols whose number of REs is larger than four as one REG, when a number of REs in one OFDM symbol is larger than four and a number of REs in the other OFDM symbol is smaller than four within two neighboring OFDM symbols which contain the REs for transmitting the CSI-RS and/or the DM-RS in one physical resource block; and the sending terminal equipment configures four remaining REs in the two neighboring OFDM symbols as the REG and determines other remaining REs in the two neighboring OFDM symbols as remaining REs which do not constitute the REG in the two neighboring OFDM symbols, when a sum of a number of the remaining REs in the OFDM symbol whose number is larger than four after constituting the REG and a number of the remaining REs in the other OFDM symbol whose number is smaller than four is larger than four.

(2) The sending terminal equipment configures every four REs in two neighboring OFDM symbols as one REG respectively, when each of numbers of REs in two neighboring OFDM symbols which contain REs for transmitting the CSI-RS and/or the DM-RS in one physical resource block is larger than four; and the sending terminal equipment configures four remaining REs in the two neighboring OFDM symbols as the REG and determines other remaining REs as remaining REs which do not constitute the REG in the two neighboring OFDM symbols, when a sum of remaining REs after constituting the REG in the two neighboring OFDM symbols is larger than four.

(3) The sending terminal equipment configures four remaining REs in the two neighboring OFDM symbols as one REG and determines other remaining REs as the remaining REs which do not constitute the REG in the two neighboring OFDM symbols, when each of numbers of remaining REs in two neighboring OFDM symbols which contain REs for transmitting the CSI-RS and/or the DM-RS in one physical resource block is smaller than four, but a sum of the numbers of REs in the two neighboring OFDM symbols is larger than four.

Step S502: the sending terminal equipment for sending the backhaul link control channel information discards the remaining REs which do not constitute the REG in the OFDM symbol and transmits the backhaul link control channel information through the REG or discards the REG.

When the sending terminal equipment constitutes several REGs in a physical resource block, then in this step, the sending terminal equipment may adopt the same processing strategy for all REGs. Namely it can either configure all REGs to send the backhaul link control channel information, or discard all of them.

On the other hand, in this step, the sending terminal equipment may well adopt different process strategies for each of the REGs respectively. For instance, the sending terminal equipment sends the backhaul link control channel information through one or more REGs within all REGs, or discards one or more REGs within all REGs.

However in this step, the remaining REs that fail to constitute the REG in OFDM symbols are destined to be discarded.

Figure 6:
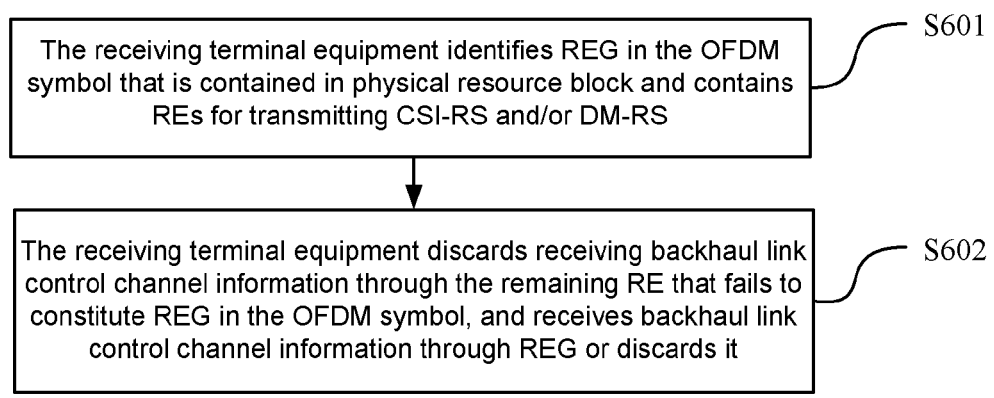
FIG. 6 is a flow chart of a resource allocation method for backhaul link control channel information provided by the embodiments of the present invention at a receiving terminal.

The technical solution described above refers to the process of realizing technical solutions of the embodiments of the present invention at the sending terminal equipment side of the backhaul link control channel information. Meanwhile, the embodiments of the present invention also provide the corresponding process at the receiving terminal equipment side. The flow chart is shown in FIG. 6, which includes the following steps as below:

Step S601: the receiving terminal equipment for receiving the backhaul link control channel information identifies a Resource Element Group (REG) in an Orthogonal Frequency Division Multiplexing (OFDM) symbol, wherein the OFDM symbol contains Resource Elements (REs) for transmitting a Channel State Information Reference Signal (CSI-RS) and/or a Demodulation Reference Signal (DM-RS) in a physical resource block.

Corresponding to the situation in step S501 of the aforesaid technical solution, in specific applications, the scheme for constituting the REG identified in this step may include a combination of two or more schemes as below:

Scheme I: The receiving terminal equipment for receiving the backhaul link control channel information identifies the REG in one OFDM symbol, wherein the OFDM symbol that is contained in a physical resource block only includes REs for transmitting the CSI-RS. According to a number of remaining REs in the OFDM symbol, the scheme may further include the following two cases:

(1) The receiving terminal equipment identifies the REG constituted by every four remaining REs, and other remaining REs which do not constitute the REG, when one physical resource block only contains the REs for transmitting the CSI-RS and a number of remaining REs in one OFDM symbol within neighboring OFDM symbols which does not contain the REs for transmitting the CSI-RS is larger than four.

(2) The receiving terminal equipment identifies entirely remaining REs in one OFDM symbol as REs which do not constitute the REG in the OFDM symbol, when one physical resource block only contains the REs for transmitting the CSI-RS and a number of REs in the OFDM symbol within neighboring OFDM symbols which does not contain the REs for transmitting the CSI-RS is smaller than four.

Scheme II: The receiving terminal equipment for receiving the backhaul link control channel information identifies the REG in two neighboring OFDM symbols, wherein the two neighboring OFDM symbols that are contained in the physical resource block include REs for transmitting the CSI-RS and/or the DM-RS. According to a number of remaining REs in the OFDM symbols, the above scheme may further include the following three cases:

(1) The receiving terminal equipment identifies that every four REs in OFDM symbols whose number of REs is larger than four constitute one REG, when a number of REs in one OFDM symbol is larger than four and a number of REs in the other OFDM symbol is smaller than four within two neighboring OFDM symbols which contain the REs for transmitting the CSI-RS and/or the DM-RS in one physical resource block; and identifies that four remaining REs in the two neighboring OFDM symbols constitute the REG and identifies other remaining REs in the two neighboring OFDM symbols as remaining REs which do not constitute the REG in the two neighboring OFDM symbols, when a sum of a number of the remaining REs in the OFDM symbol whose number is larger than four after constituting the REG and a number of the remaining REs in the other OFDM symbol whose number is smaller than four is larger than four.

(2) The receiving terminal equipment identifies that every four REs in two neighboring OFDM symbols constitute one REG respectively, when each of numbers of REs in two neighboring OFDM symbols which contain REs for transmitting the CSI-RS and/or the DM-RS in one physical resource block is larger than four; and identifies that four remaining REs in the two neighboring OFDM symbols constitute the REG and identifies other remaining REs as remaining REs which do not constitute the REG in the two neighboring OFDM symbols, when a sum of remaining REs after constituting the REG in the two neighboring OFDM symbols is larger than four.

(3) The receiving terminal equipment identifies that four remaining REs in the two neighboring OFDM symbols constitute one REG and identifies other remaining REs as the remaining REs which do not constitute the REG in the two neighboring OFDM symbols, when each of numbers of remaining REs in two neighboring OFDM symbols which contain REs for transmitting the CSI-RS and/or the DM-RS in one physical resource block is smaller than four, but a sum of the numbers of REs in the two neighboring OFDM symbols is larger than four.

Step S602: The receiving terminal equipment for receiving the backhaul link control channel information discards receiving the backhaul link control channel information through the remaining REs which do not constitute the REG in the OFDM symbol, and receives the backhaul link control channel information through the REG or discards receiving the backhaul link control channel information through the REG.

The receiving terminal equipment discards receiving the backhaul link control channel information through remaining REs which do not constitute the REG in the OFDM symbol, and receives the backhaul link control channel information through one or more REGs and/or discards receiving the backhaul link control channel information through the one or more REGs, when there are a plurality of REGs constituted in one physical resource block identified by the receiving terminal equipment.

However in this step, as for the remaining REs that fail to constitute an REG in an OFDM symbol, the strategy is to discard receiving the backhaul link control channel information through the remaining REs that fail to constitute the REG.

Compared with the related art, the embodiments of the present invention have the following advantages:

Upon application of technical solutions proposed by embodiments of the present invention and based on the condition of introducing the DMRS and CSI-RS, remaining REs which are not occupied by the CSI-RS and/or the DM-RS in an OFDM symbol is configured to constitute an REG, which is used to transmit or discard the backhaul link control channel information. Thus without much improvement on the existing LTE system specification, a resource allocation scheme of the backhaul link control channel information in corresponding physical resource blocks has been proposed, which accommodates for both simple specification design and full utilization on resources, and realizes flexible design and allocation in light of demands of the real system.

Detailed description of technical solutions proposed by embodiments of the present invention is given as below in combination with specific application context.

Technical solutions proposed by the embodiments of the present invention mainly aim at providing a new R-PDCCH resource allocation scheme under the circumstance of introducing DMRS and CSI-RS in the R-PDCCH area, thus ensuring normal processing and demodulation at both sending and receiving terminals of R-PDCCH.

Technical solutions proposed by the embodiments of the present invention first reserve all REs occupied by CSI-RS ports configured by an eNB. DMRS belongs to special pilot frequency of a UE, so the eNB may configure DM-RS with different port numbers for various RNs. To ensure a uniform method for controlling resource allocation of all RNs, the technical solutions proposed by the embodiments of the present invention reserve all REs occupied by four DM-RS ports. As CRS and CSI-RS as well as CRS and DMRS cannot be multiplexed in the same OFDM symbol, OFDM symbols with DMRS and CSI-RS can be divided into two cases as below:

Case I: there exists CSI-RS only in a certain OFDM symbol, and no CSI-RS in a neighboring OFDM symbol of backhaul link adjacent to the OFDM symbol.

For such case, there are two R-PDCCH configuration schemes:

Scheme I: Configuring every four REs among the remaining REs having more than four REs in OFDM symbols to constitute into one REG and assign the REG to R-PDCCH, then discarding those REs whose number is less than four after the above configuration, with examples shown in FIGS. 7, 8 and 9.

Figure 7:
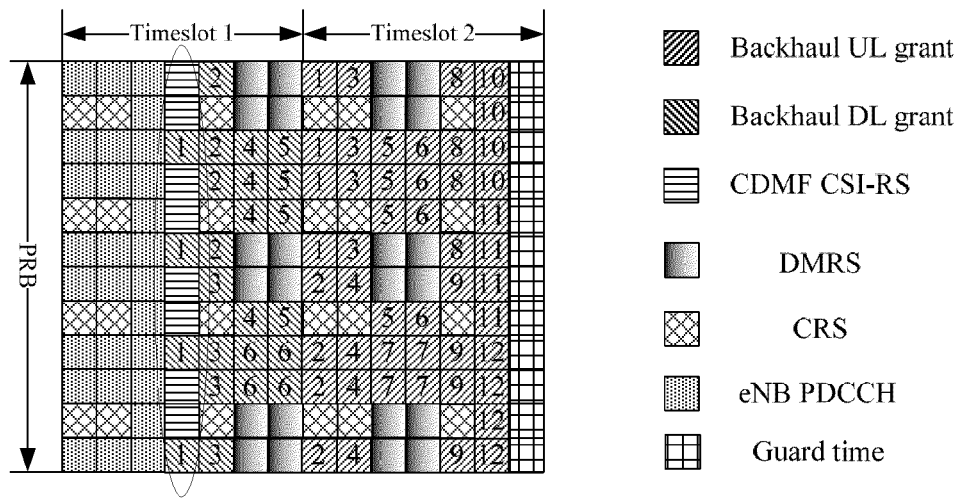
FIG. 7 through FIG. 22 are diagrams for dozens of scenarios with respect to resource allocations for backhaul link control channel information provided by the embodiments of the present invention.

In the scheme shown in FIG. 7, there are eight REs for transmitting CSI-RS in one OFDM symbol of timeslot 1 with four REs left. Therefore, configuring the four Res to constitute into the REG for transmitting R-PDCCH is achieved.

Figure 8:
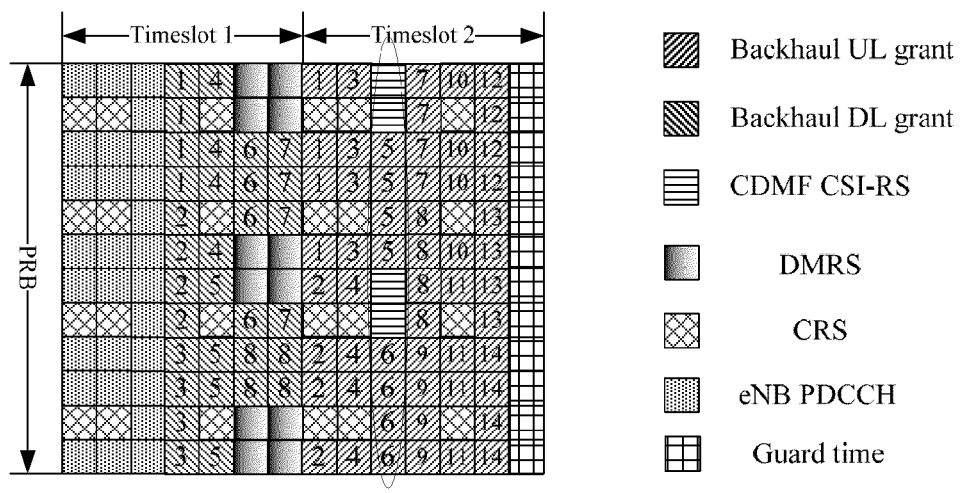

In the scheme shown in FIG. 8, there are four REs for transmitting CSI-RS in one OFDM symbol of timeslot 2 with eight REs left. Therefore, configuring every four REs out of the eight REs to constitute into one REG for transmitting R-PDCCH is achieved.

Figure 9:
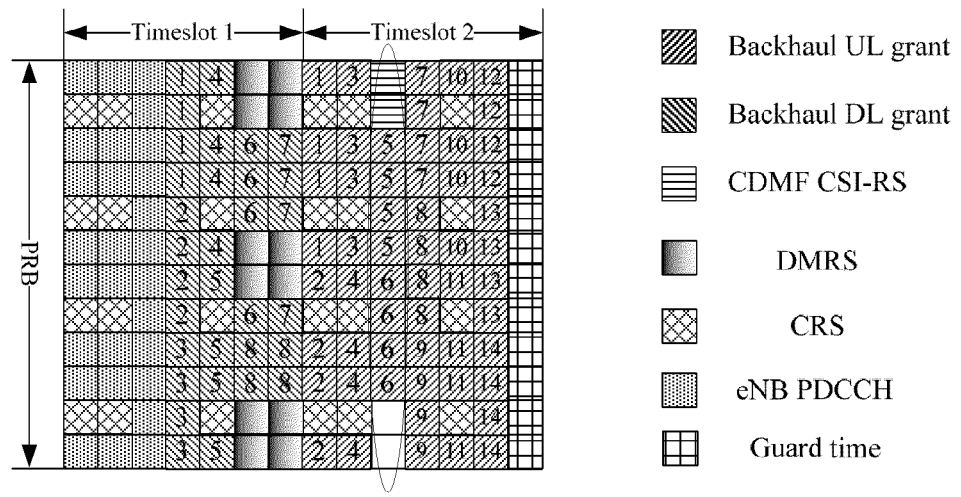

In the scheme shown in FIG. 9, there are two REs for transmitting CSI-RS in one OFDM symbol of timeslot 2 with ten REs left. Therefore, configuring every four REs out of the first eight REs to constitute into one REG, and forming two REGs in total, for transmitting R-PDCCH, then discarding the last two REs.

Scheme II: Discarding all remaining REs in the OFDM symbol, not for transmitting R-PDCCH, with examples shown in FIGS. 10 and 11.

Figure 10:
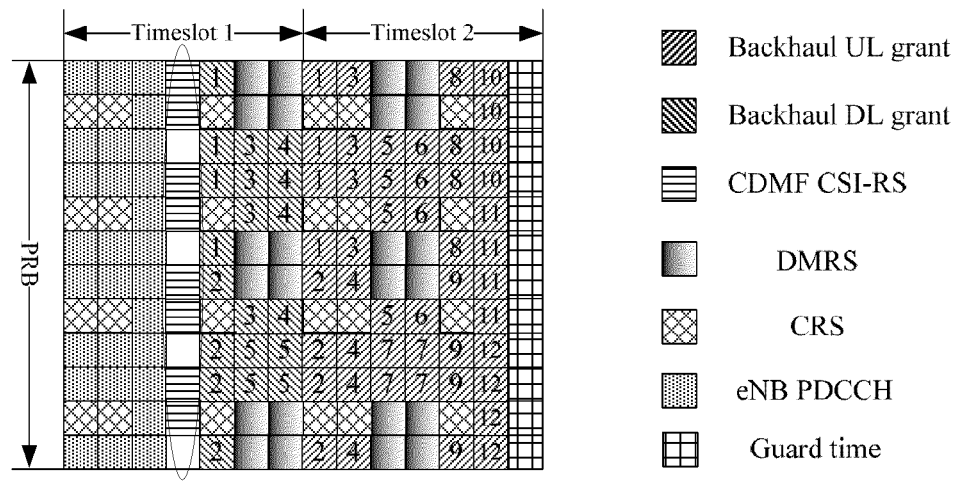

In the scheme shown in FIG. 10, there are eight REs for transmitting CSI-RS in one OFDM symbol of timeslot 1 with four REs left. Therefore, configuring the four REs to constitute into the REG and discarding it, not for transmitting R-PDCCH.

Figure 11:
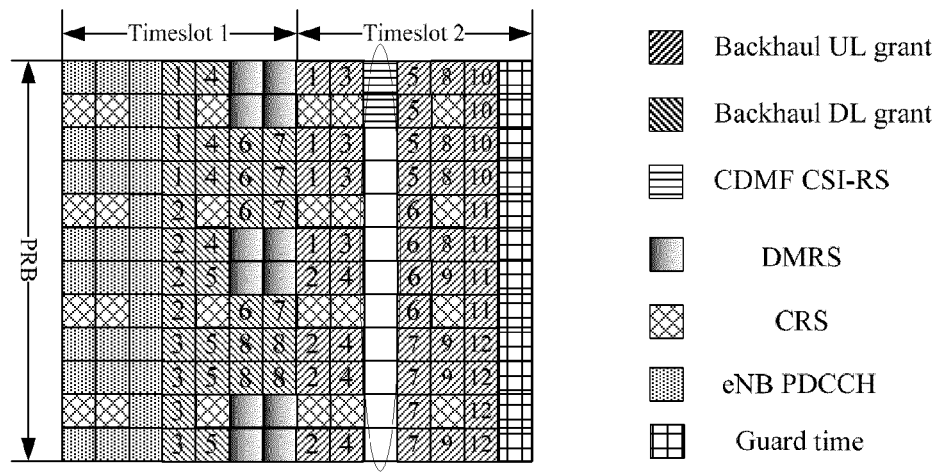

In the scheme shown in FIG. 11, there are two REs for transmitting CSI-RS in one OFDM symbol of timeslot 2 with ten REs left. Therefore, configuring every four REs out of the first eight REs to constitute into one REG and discarding the total two REGs, not for transmitting R-PDCCH, then discarding the last two REs as well.

Case II: there exist(s) DM-RS and/or CSI-RS at least in two successive OFDM symbols.

For such case, there are three R-PDCCH configuration schemes:

Scheme I: For each PRB, configuring every four REs out of the available REs whose number is more than four in each OFDM symbol of two successive symbols to constitute into one REG for transmitting R-PDCCH, then discarding remaining REs whose number is less than four in each OFDM symbol after the above configuration, with examples shown in FIGS. 12, 13, 14 and 15.

Figure 12:
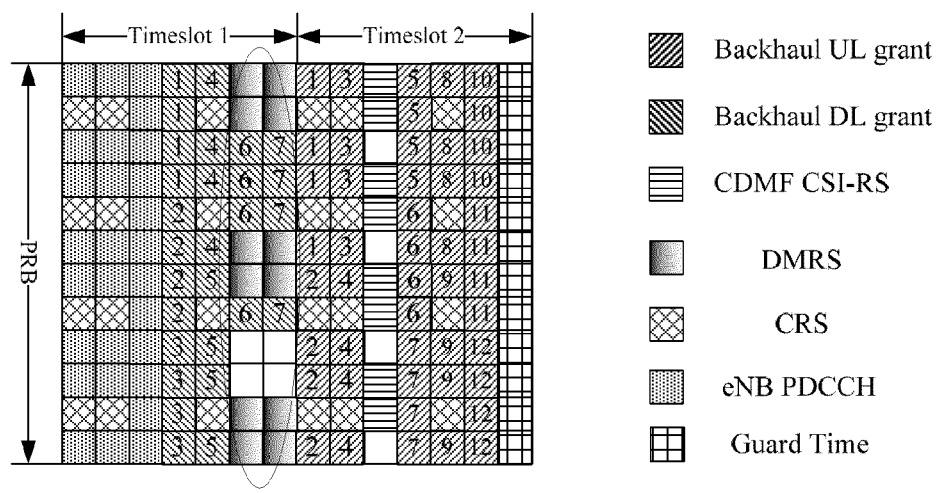

In the scheme shown in FIG. 12, two neighboring OFDM symbols of timeslot 1 transmit DM-RS in timeslot 1, and six REs within each OFDM symbol are reserved for DM-RS, so six REs are left in each OFDM symbol. Therefore, selecting the first four REs in each OFDM symbol to form an REG for transmitting R-PDCCH; besides, there are two REs left in each OFDM symbol, which shall be discarded and not used for transmitting R-PDCCH. In FIG. 12, there are two REGs totally formed in two neighboring OFDM symbols for transmitting R-PDCCH.

It needs to be pointed out that in FIG. 12, there is still one OFDM symbol for transmitting CSI-RS in timeslot 2, which can be processed by relevant scheme in the aforesaid case I. Such a method for processing by a combination of two schemes can better enrich resource allocation scheme. The protection scope of the present invention will not be limited by specific constitution scheme adopted and specific formal changes of the combination.

Figure 13:
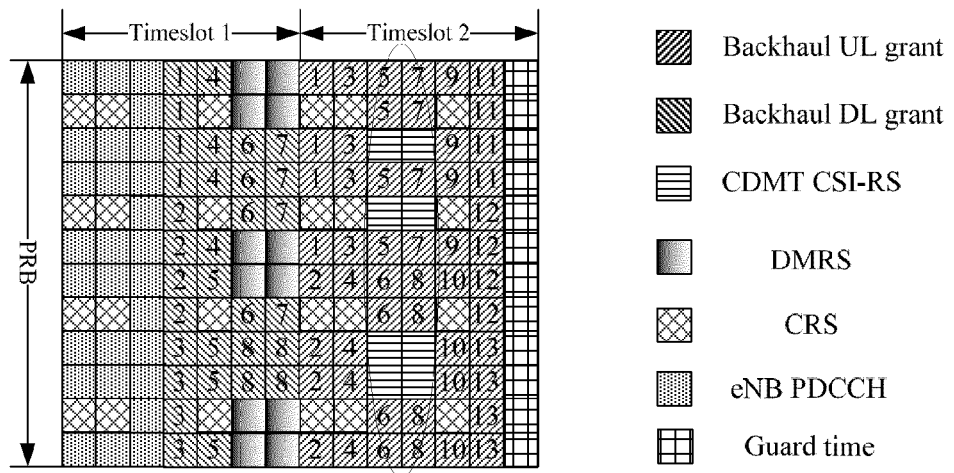

In the scheme shown in FIG. 13, two neighboring OFDM symbols transmit CSI-RS in timeslot 2, and four REs within each OFDM symbol are transmitting CSI-RS, so eight REs are left in each OFDM symbol. Therefore, configuring every four REs in remaining eight REs of each OFDM symbol to constitute into an REG for transmitting R-PDCCH; after the above configuration, no RE is left. In FIG. 13, there are four REGs totally formed in two neighboring OFDM symbols for transmitting R-PDCCH.

Figure 14:
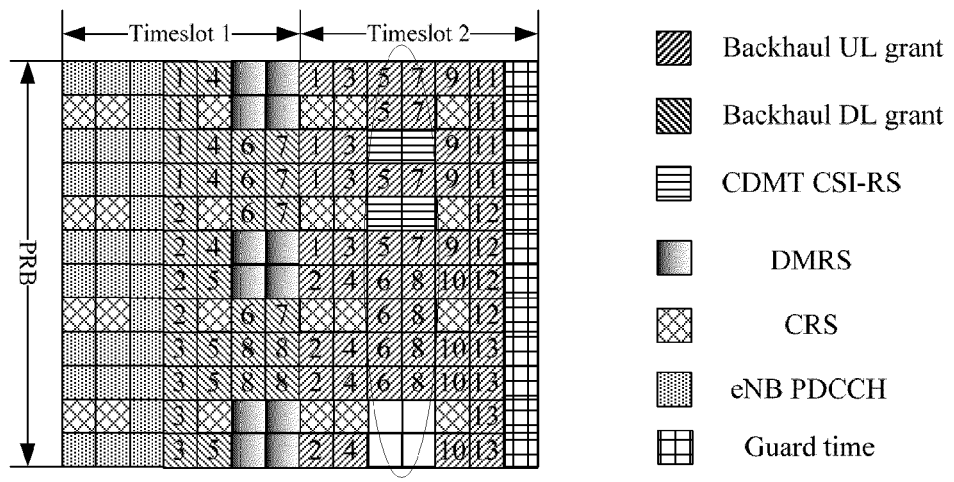

In the scheme shown in FIG. 14, two neighboring OFDM symbols for transmitting CSI-RS in timeslot 2, and two REs within each OFDM symbol are transmitting CSI-RS, so ten REs are left in each OFDM symbol. Therefore, configuring every four REs out of the first eight REs in remaining ten REs of each OFDM symbol to constitute into an REG for transmitting R-PDCCH; after the above configuration, there are two REs left in each symbol and four REs in two OFDM symbols, which shall be discarded and not used for transmitting R-PDCCH. In FIG. 14, there are four REGs totally formed in two neighboring OFDM symbols for transmitting R-PDCCH, with four REs discarded.

Figure 15:
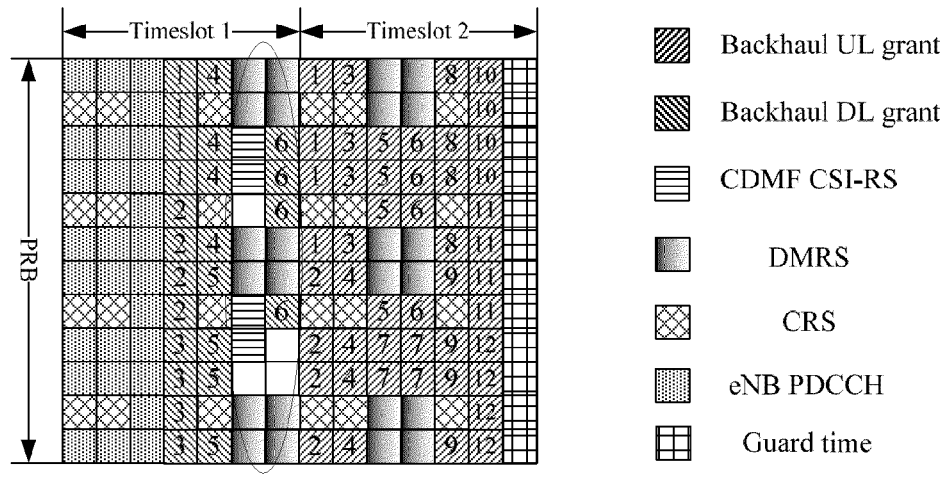

In the scheme shown in FIG. 15, two neighboring OFDM symbols transmit DM-RS in timeslot 1, in which the left-side OFDM symbol also transmits CSI-RS, and six REs in each OFDM symbol are reserved for DM-RS, with four REs in the left-side OFDM symbol for transmitting CSI-RS. Therefore, the left-side OFDM symbol has two REs left (less than four), which shall be discarded. The right-side OFDM symbol has six REs left, the first four REs of which shall be formed into an REG for transmitting R-PDCCH with the last two REs discarded. In FIG. 15, there is one REG totally formed in two neighboring OFDM symbols in timeslot 1 for transmitting R-PDCCH, with four REs discarded.

Scheme II: For each PRB, configuring every four REs out of the available REs whose number is more than four in each OFDM symbol of the two symbols to constitute into one REG for transmitting R-PDCCH. If the total remaining REs of the two OFDM symbols after the above configuration is not less than four, aggregating remaining REs of the two OFDM symbols together to form an REG with every four REs, and then discarding remaining REs afterward. Examples are shown in FIGS. 16, 17 and 18.

Figure 16:
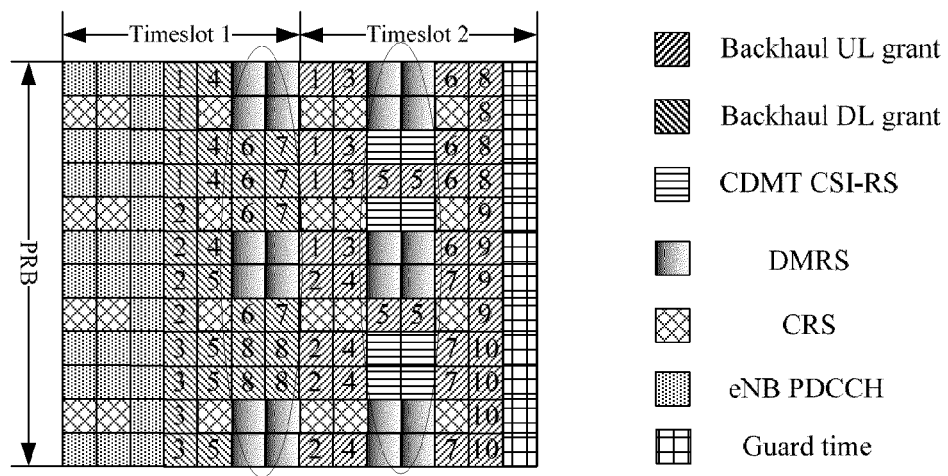

In the scheme shown in FIG. 16, two neighboring OFDM symbols transmit DM-RS in timeslots 1 and 2 respectively. For the two neighboring OFDM symbols in timeslot 1, there are six REs in each OFDM symbol reserved for DM-RS, so each OFDM symbol has six REs left, the first four of which shall be selected to form an REG, with two REs left in each OFDM symbol, and four REs in total in two OFDM symbols. Therefore, configuring the last two REs left in each OFDM symbol of timeslot 1 to constitute into an REG, and using all the above REGs to transmit R-PDCCH. As for the two neighboring OFDM symbols in timeslot 2, there are six REs for transmitting DM-RS in each OFDM symbol respectively, with eight REs for transmitting CSI-RS additionally, so 2 REs are left in each OFDM symbol, 4 REs in total. Therefore, configuring remaining two REs (four in total) in each OFDM symbol of timeslot 2 to constitute into one REG for transmitting R-PDCCH is achieved. In FIG. 16, there are four REGs totally formed in two neighboring OFDM symbols of timeslots 1 and 2, all of which are used for transmitting R-PDCCH.

Figure 17:
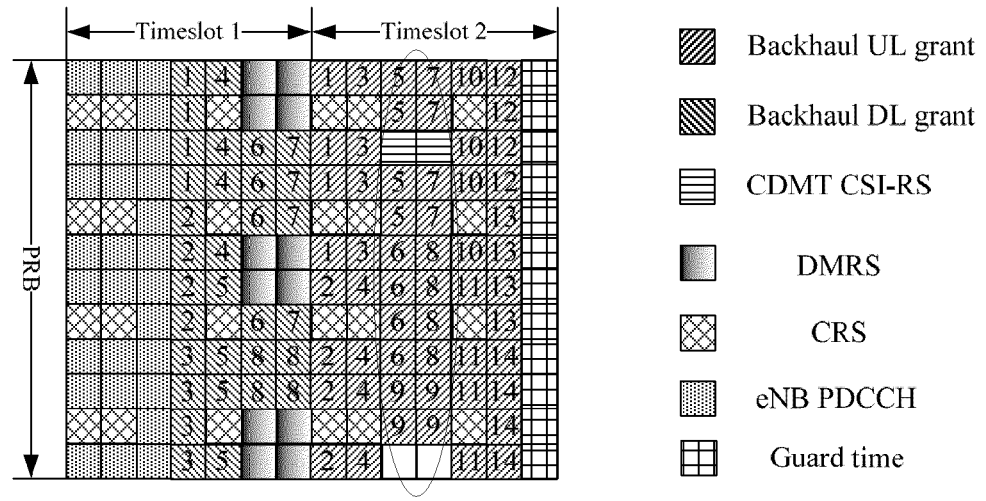

In the scheme shown in FIG. 17, two neighboring OFDM symbols transmit CSI-RS in timeslot 2, and one RE within each OFDM symbol is transmitting CSI-RS with eleven REs left in each OFDM symbol respectively, so every four of the first eight REs in each OFDM symbol constitute into one REG. Besides, there are three REs left in each OFDM symbol, six in total. Therefore, the first two REs left in each OFDM symbol constitute into an REG, and then each OFDM has one RE left, two REs in total, which shall be discarded. All of the above REGs shall be used for transmitting R-PDCCH. In FIG. 17, there are five REGs totally formed in two neighboring OFDM symbols of timeslot 2, all of which are used for transmitting R-PDCCH, with two REs discarded.

Figure 18:
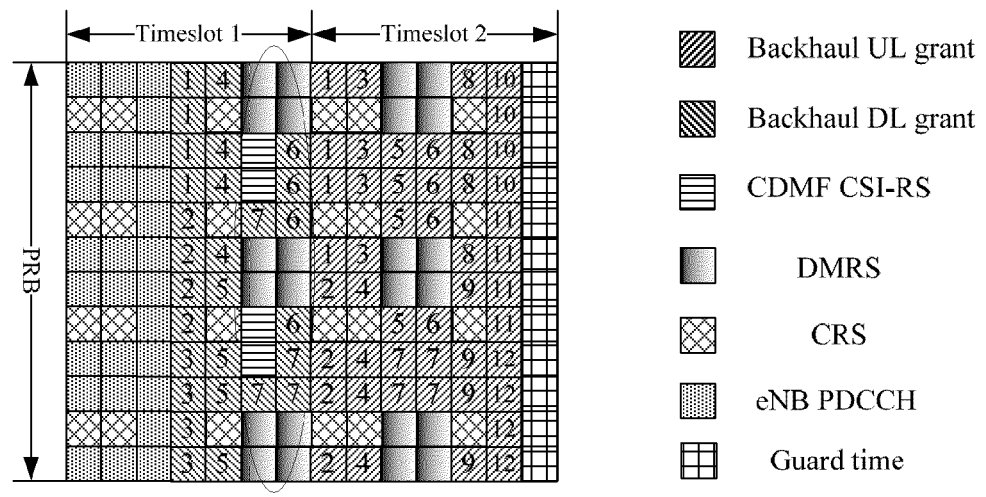

In the scheme shown in FIG. 18, two neighboring OFDM symbols transmit DM-RS in timeslot 1, in which the left-side OFDM symbol also transmits CSI-RS, and six REs within each OFDM symbol are reserved for DM-RS, with four REs of the left-side OFDM symbol transmitting CSI-RS. The right-side OFDM symbol has six REs left, the first four of which shall be constituted into one REG with two REs left. Meanwhile, the left-side OFDM symbol also has two available REs left. Therefore, the four REs left within the above two OFDM symbols can be constituted into an REG for transmitting R-PDCCH. In FIG. 18, there are two REGs totally formed in two neighboring OFDM symbols of timeslot 1 for transmitting R-PDCCH.

Scheme III: discarding all REs in the two OFDM symbols, not for transmitting R-PDCCH, with examples shown in FIGS. 19, 20, 21 and 22.

Figure 19:
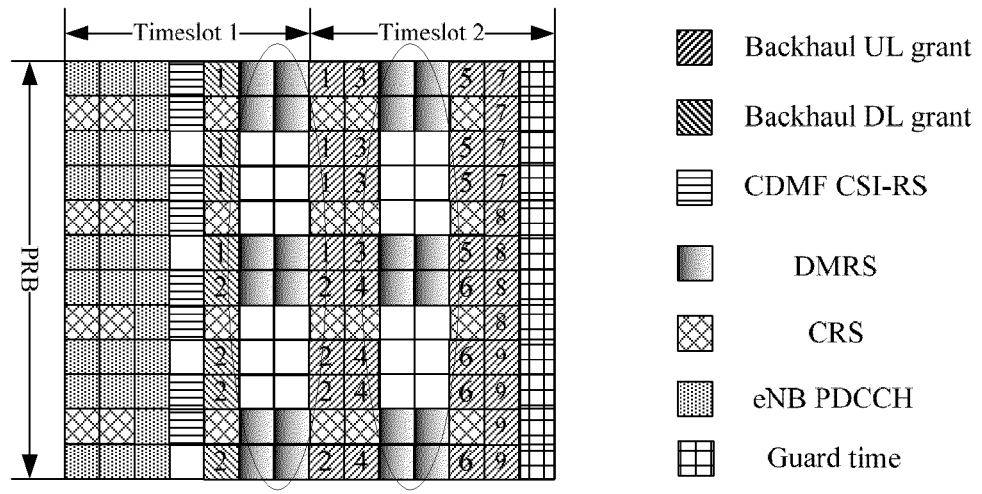

In the scheme shown in FIG. 19, two neighboring OFDM symbols transmit DM-RS in timeslots 1 and 2 with six REs for transmitting DM-RS in each OFDM symbol respectively, so each OFDM symbol has six REs left, the first four of which shall be selected to form an REG, with two REs left in each symbol. Therefore, configuring the last two REs left in each OFDM symbol of timeslot 1 and 2 to constitute into an REG, and then discarding all the above REGs instead of using them for transmitting R-PDCCH. In FIG. 19, there are six REGs totally formed in two neighboring OFDM symbols of timeslots 1 and 2, which shall all be discarded instead of being used for transmitting R-PDCCH.

It needs to be pointed out that in FIG. 19, there is still one OFDM symbol for transmitting CSI-RS in the timeslot 1, which can be processed by relevant scheme in the aforesaid case I. Such mode of processing by a combination of two schemes can better enhance resource allocation scheme. The protection scope of the present invention will not be limited by specific constitution scheme adopted and specific formal changes of the combination.

Figure 20:
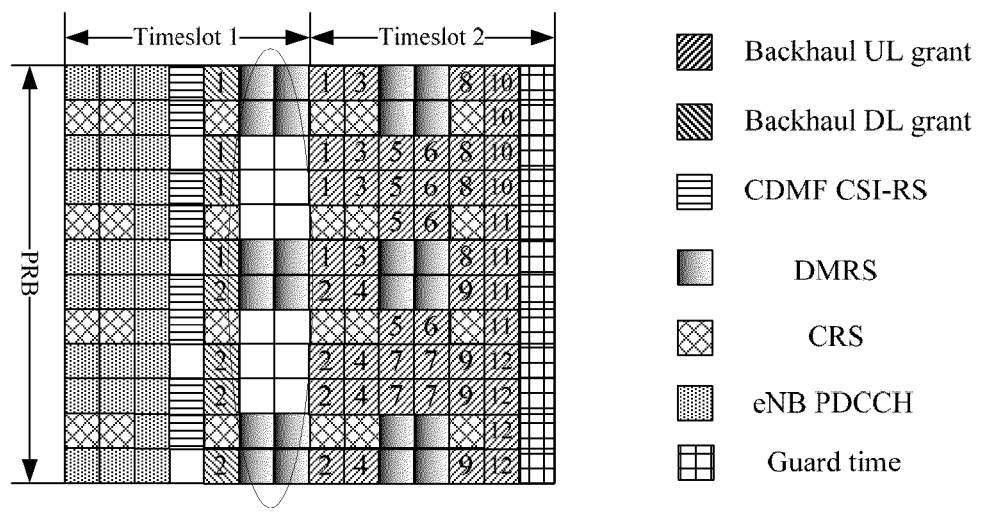

In the scheme shown in FIG. 20, two neighboring OFDM symbols transmit DM-RS in timeslots 1 and 2 with six REs for transmitting DM-RS in each OFDM symbol respectively, so each OFDM symbol has six REs left, the first four of which shall be selected to form an REG, with two left in each symbol. Therefore, the last two REs left in each OFDM symbol of timeslots 1 and 2 are enabled to constitute into an REG. Then in FIG. 20, there are six REGs totally formed in two neighboring OFDM symbols of timeslots 1 and 2, among which the three REGs in two neighboring OFDM symbols of timeslot 1 shall be discarded instead of being used for transmitting R-PDCCH, while the three REGs in two neighboring OFDM symbols of timeslot 2 shall all be used for transmitting R-PDCCH.

It needs to be pointed out that in FIG. 20, there is still one OFDM symbol for transmitting CSI-RS in timeslot 1, which can be processed by relevant scheme in the aforesaid case I. Such mode of processing by a combination of two schemes can better enhance resource allocation scheme. The protection scope of the present invention will not be limited by specific constitution scheme adopted and specific formal changes of the combination.

Figure 21:
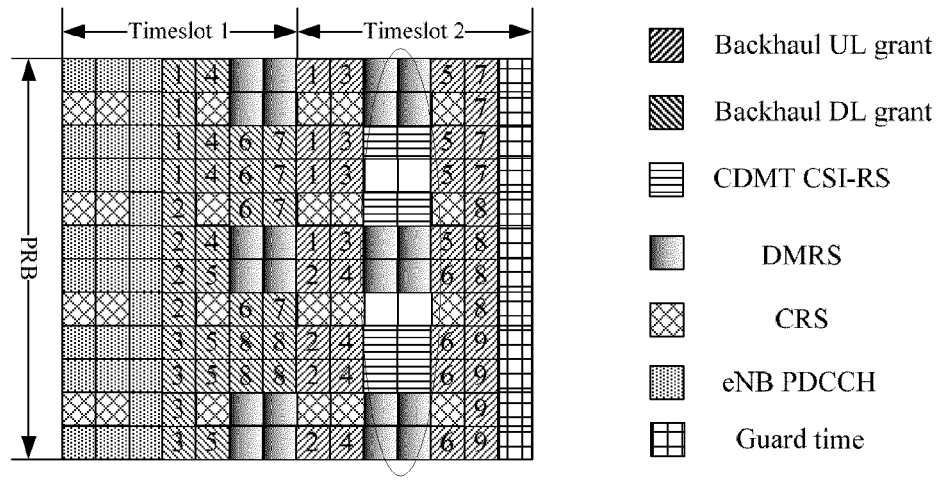

In the scheme shown in FIG. 21, two neighboring OFDM symbols transmit DM-RS in timeslots 1 and 2 respectively. For the two neighboring OFDM symbols in timeslot 2, there are six REs in each OFDM symbol reserved for DM-RS with four REs for transmitting CSI-RS, so there are only two REs left in each OFDM symbol, four REs in total. Therefore, remaining two REs in each OFDM symbol of timeslot 2 are enabled to constitute into one REG, and then discard it instead of using it for transmitting R-PDCCH. For timeslot 1, there are six REs in each OFDM symbol reserved for DM-RS, so each OFDM symbol has six REs left, the first four of which shall be selected to form one REG. Besides, two REs are left in each OFDM symbol, four REs in total. Therefore, the last two REs left in each OFDM symbol of timeslot 1 are enabled to constitute into the REG. In FIG. 21, there are four REGs totally formed in two neighboring OFDM symbols of timeslots 1 and 2, among which three REGs in two neighboring OFDM symbols of timeslot 1 shall all be used for transmitting R-PDCCH, while one REG in two neighboring OFDM symbols of timeslot 2 shall be discarded instead of being used for transmitting R-PDCCH.

Figure 22:
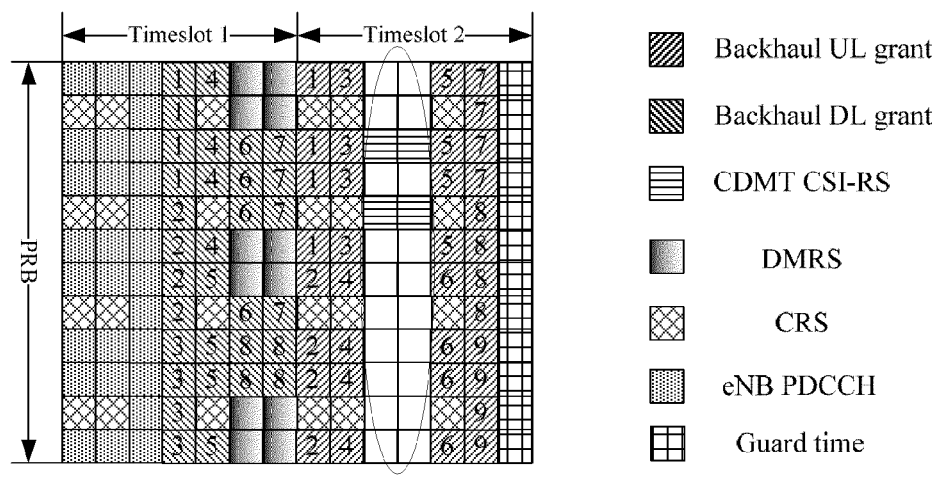

In the scheme shown in FIG. 22, two neighboring OFDM symbols transmit CSI-RS in timeslot 2, and two REs within each OFDM symbol are transmitting CSI-RS with ten REs left in each OFDM symbol respectively, so every four of the first eight REs out of remaining ten REs in each OFDM symbol are enabled to constitute into one REG. After the above configuration, each symbol has two REs left, four REs in total, which shall be formed into one REG. Therefore, there are five REGs totally formed in two neighboring OFDM symbols for CSI-RS transmission in timeslot 2, all of which shall be discarded instead of being used for transmitting R-PDCCH. For two neighboring OFDM symbols for DM-RS transmission in timeslot 1, totally three REGs are configured as per scheme II for transmitting R-PDCCH. In FIG. 22, two neighboring OFDM symbols of each timeslot form eight REGs totally, among which three REGs in two neighboring OFDM symbols of timeslot 1 shall all be used for transmitting R-PDCCH, while five REGs in two neighboring OFDMs of timeslot 2 shall be discarded.

Compared with the related art, the embodiments of the present invention have the following advantages:

Upon application of technical solutions proposed by embodiments of the present invention and based on the condition of introducing the DMRS and CSI-RS, remaining REs which are not occupied by the CSI-RS and/or the DM-RS in an OFDM symbol is configured to constitute an REG, which is used to transmit or discard the backhaul link control channel information. Thus without much improvement on the existing LTE system specification, a resource allocation scheme of the backhaul link control channel information in corresponding physical resource blocks has been proposed, which accommodates for both simple specification design and full utilization on resources, and realizes flexible design and allocation in light of demands of the real system.

Figure 23:
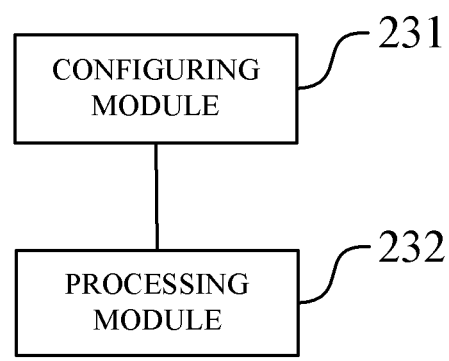
FIG. 23 is a structure diagram of a sending terminal equipment for backhaul link control channel information provided by the embodiments of the present invention.

To realize the technical solutions proposed by the embodiments of the present invention, a sending terminal equipment for sending the backhaul link control channel information is also provided with its structure diagram shown in FIG. 23, further including:

a configuring module 231, which is used to configure remaining REs which are not occupied by a CSI-RS and/or a DM-RS in an OFDM symbol as a Resource Element Group (REG), wherein the OFDM symbol contains REs for transmitting the CSI-RS and/or the DM-RS in a physical resource block.

In specific applications, constitution scheme of REG of the configuring module 231 includes the following two schemes, or a combination of several schemes.

Scheme I: the configuring module 231 is used to configure remaining REs which are not occupied by a CSI-RS and/or a DM-RS in an OFDM symbol as a Resource Element Group (REG), wherein the OFDM symbol contains REs for transmitting the CSI-RS and/or the DM-RS in a physical resource block may be specifically as:

the configuring module 231 is used to configure every four remaining REs as one REG, and determine other remaining REs as REs which do not constitute the REG, when one physical resource block only contains the REs for transmitting the CSI-RS and a number of remaining REs in one OFDM symbol within neighboring OFDM symbols which does not contain the REs for transmitting the CSI-RS is larger than four; or the configuring module 231 is used to configure entirely remaining REs in one OFDM symbol as REs which do not constitute the REG in the OFDM symbol, when one physical resource block only contains the REs for transmitting the CSI-RS and a number of REs in the OFDM symbol within neighboring OFDM symbols which does not contain the REs for transmitting the CSI-RS is smaller than four.

Scheme II: the configuring module 231 configures remaining REs in two neighboring OFDM symbols as the REG, wherein the two neighboring OFDM symbols that are contained in the physical resource block include REs for transmitting the CSI-RS and/or the DM-RS may be specifically as:

the configuring module 231 is used to configure every four REs in OFDM symbols whose number of REs is larger than four as one REG, when a number of REs in one OFDM symbol is larger than four and a number of REs in the other OFDM symbol is smaller than four within two neighboring OFDM symbols which contain the REs for transmitting the CSI-RS and/or the DM-RS in one physical resource block; and the configuring module 231 is used to configure four remaining REs in the two neighboring OFDM symbols as the REG and determine other remaining REs in the two neighboring OFDM symbols as remaining REs which do not constitute the REG in the two neighboring OFDM symbols, when a sum of a number of the remaining REs in the OFDM symbol whose number is larger than four after constituting the REG and a number of the remaining REs in the other OFDM symbol whose number is smaller than four is larger than four; or the configuring module 231 is used to configure every four REs in two neighboring OFDM symbols as one REG respectively, when each of numbers of REs in two neighboring OFDM symbols which contain REs for transmitting the CSI-RS and/or the DM-RS in one physical resource block is larger than four; and the configuring module 231 is used to configure four remaining REs in the two neighboring OFDM symbols as the REG and determine other remaining REs as remaining REs which do not constitute the REG in the two neighboring OFDM symbols, when a sum of remaining REs after constituting the REG in the two neighboring OFDM symbols is larger than four; or the configuring module 231 is used to configure four remaining REs in the two neighboring OFDM symbols as one REG and determine other remaining REs as the remaining REs which do not constitute the REG in the two neighboring OFDM symbols, when each of numbers of remaining REs in two neighboring OFDM symbols which contain REs for transmitting the CSI-RS and/or the DM-RS in one physical resource block is smaller than four, but a sum of the numbers of REs in the two neighboring OFDM symbols is larger than four.

a processing module 232, which is used to discard the remaining REs which do not constitute the REG in the OFDM symbol, and transmit the backhaul link control channel information through the REG or discarding the REG constituted by the configuring module 231.

the processing module 232 is used to discard remaining REs which do not constitute the REG in the OFDM symbol, and transmit the backhaul link control channel information through one or more REGs and/or discard the one or more REGs, when there are a plurality of REGs constituted in one physical resource block by the configuring module 231.

Figure 24:
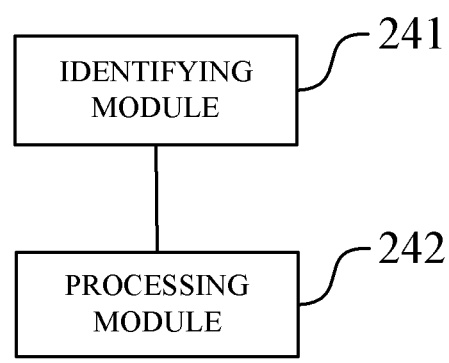
FIG. 24 is a structure diagram of a receiving terminal equipment for backhaul link control channel information provided by the embodiments of the present invention.

On the other hand, the embodiments of the present invention also provide a receiving terminal equipment for receiving the backhaul link control channel information with its structural diagram shown in FIG. 24, further including:

an identifying module 241, which is used to identify an REG in an OFDM symbol, wherein the OFDM symbol contains REs for transmitting a CSI-RS and/or a DM-RS in a physical resource block.

In specific application scene, constitution scheme of the REG identified by identification module 241 includes the following two kinds, or a combination of several schemes.

Scheme I: the identifying module 241 is used to identify the REG in one OFDM symbol, wherein the OFDM symbol that is contained in a physical resource block only includes REs for transmitting the CSI-RS and neighboring OFDM symbols of the OFDM symbol do not include REs for transmitting the CSI-RS, which is specifically as:

the identifying module 241 is used to identify the REG constituted by every four remaining REs, and other remaining REs which do not constitute the REG, when one physical resource block only contains the REs for transmitting the CSI-RS and a number of remaining REs in one OFDM symbol within neighboring OFDM symbols which does not contain the REs for transmitting the CSI-RS is larger than four; or the identifying module 241 is used to identify entirely remaining REs in one OFDM symbol as REs which do not constitute the REG in the OFDM symbol, when one physical resource block only contains the REs for transmitting the CSI-RS and a number of REs in the OFDM symbol within neighboring OFDM symbols which does not contain the REs for transmitting the CSI-RS is smaller than four.

Scheme II: the identifying module 241 is used to identify the REG in two neighboring OFDM symbols, wherein the two neighboring OFDM symbols that are contained in the physical resource block include REs for transmitting the CSI-RS and/or the DM-RS, which is specifically as:

the identifying module 241 is used to identify that every four REs in OFDM symbols whose number of REs is larger than four constitute one REG, when a number of REs in one OFDM symbol is larger than four and a number of REs in the other OFDM symbol is smaller than four within two neighboring OFDM symbols which contain the REs for transmitting the CSI-RS and/or the DM-RS in one physical resource block; and the identifying module 241 is used to identify that four remaining REs in the two neighboring OFDM symbols constitute the REG and identify other remaining REs in the two neighboring OFDM symbols as remaining REs which do not constitute the REG in the two neighboring OFDM symbols, when a sum of a number of the remaining REs in the OFDM symbol whose number is larger than four after constituting the REG and a number of the remaining REs in the other OFDM symbol whose number is smaller than four is larger than four; or the identifying module 241 is used to identify that every four REs in two neighboring OFDM symbols constitute one REG respectively, when each of numbers of REs in two neighboring OFDM symbols which contain REs for transmitting the CSI-RS and/or the DM-RS in one physical resource block is larger than four; and the identifying module 241 is used to identify that four remaining REs in the two neighboring OFDM symbols constitute the REG and identify other remaining REs as remaining REs which do not constitute the REG in the two neighboring OFDM symbols, when a sum of remaining REs after constituting the REG in the two neighboring OFDM symbols is larger than four; or the identifying module 241 is used to identify that four remaining REs in the two neighboring OFDM symbols constitute one REG and the identifying module 241 is used to identify other remaining REs as the remaining REs which do not constitute the REG in the two neighboring OFDM symbols, when each of numbers of remaining REs in two neighboring OFDM symbols which contain REs for transmitting the CSI-RS and/or the DM-RS in one physical resource block is smaller than four, but a sum of the numbers of REs in the two neighboring OFDM symbols is larger than four.

a processing module 242, which is used to discard receiving the backhaul link control channel information through the remaining REs which do not constitute the REG in the OFDM symbol, and receive the backhaul link control channel information through the REG or discard receiving the backhaul link control channel information through the REG. identified by the identifying module 241.

the processing module 242 is used to discard receiving the backhaul link control channel information through remaining REs which do not constitute the REG in the OFDM symbol, and receive the backhaul link control channel information through one or more REGs and/or discard receiving the backhaul link control channel information through the one or more REGs, when there are a plurality of REGs constituted in one physical resource block identified by the identifying module 241.

Compared with related art, the embodiments of the present invention have the following advantages:

Upon application of technical solutions proposed by embodiments of the present invention and based on the condition of introducing the DMRS and CSI-RS, remaining REs which are not occupied by the CSI-RS and/or the DM-RS in an OFDM symbol is configured to constitute an REG, which is used to transmit or discard the backhaul link control channel information. Thus without much improvement on the existing LTE system specification, a resource allocation scheme of the backhaul link control channel information in corresponding physical resource blocks has been proposed, which accommodates for both simple specification design and full utilization on resources, and realizes flexible design and allocation in light of demands of the real system.

Through description of the above embodiments, a skilled person in the art can clearly understand that the present invention is realized depending on software and necessary general hardware platform, and also can be realized through hardware, while the former is better in many cases. Based on this understanding, the technical solution of the present invention or the part making contributions to present technology can be essentially reflected by means of software product. This computer software product is stored in a storage medium, including several instructions to enable a computer device (such as a personal computer, a server, or a network equipment, etc.) to implement the methods described in all embodiments of the present invention.

A skilled person in the art can appreciate that the drawings only refer to the diagram of a preferred embodiment, and the module or procedure is not indispensable for the implementation of the embodiments of the present invention.

A skilled person in the art can appreciate that the module of the unit of an embodiment can be distributed in such unit according to embodiment description, or located in one or more units of another embodiment through corresponding changes. Modules of the embodiments mentioned above can be merged into one module, or further divided into multiple submodules.

The reference number appeared in the aforementioned embodiments of the present invention is only used for description rather than for representing advantages or disadvantages.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

The invention claimed is:

1. A method for resource allocation of backhaul link control channel information, comprising the following steps:

configuring remaining Resource Elements (REs) which are not occupied by a Channel State Information Reference Signal (CSI-RS) and/or a Demodulation Reference Signal (DM-RS) in an Orthogonal Frequency Division Multiplexing (OFDM) symbol, by a sending terminal equipment for sending the backhaul link control channel information, as a Resource Element Group (REG), wherein the OFDM symbol contains REs for transmitting the CSI-RS and/or the DM-RS in a physical resource block; and discarding the remaining REs which do not constitute the REG in the OFDM symbol, by the sending terminal equipment for sending the backhaul link control channel information, and transmitting the backhaul link control channel information through the REG or discarding the REG, wherein the configuring remaining Resource Elements (REs) which are not occupied by a Channel State Information Reference Signal (CSI-RS) and/or a Demodulation Reference Signal (DM-RS) in an Orthogonal Frequency Division Multiplexing (OFDM) symbol, by a sending terminal equipment for sending the backhaul link control channel information, as a Resource Element Group (REG) comprises:

configuring, by the sending terminal equipment, remaining REs in an OFDM symbol as the REG, wherein the OFDM symbol that is contained in a physical resource block only includes REs for transmitting the CSI-RS and neighboring OFDM symbols of the OFDM symbol do not include REs for transmitting the CSI-RS; and/or configuring, by the sending terminal equipment, remaining REs in two neighboring OFDM symbols as the REG, wherein the two neighboring OFDM symbols that are contained in the physical resource block include REs for transmitting the CSI-RS and/or the DM-RS, wherein the configuring, by the sending terminal equipment, remaining REs in an OFDM symbol as the REG, wherein the OFDM symbol that is contained in a physical resource block only includes REs for transmitting the CSI-RS and neighboring OFDM symbols of the OFDM symbol do not include REs for transmitting the CSI-RS comprises:

configuring, by the sending terminal equipment, every four remaining REs as one REG, and determining other remaining REs as REs which do not constitute the REG, when one physical resource block only contains the REs for transmitting the CSI-RS and a number of remaining REs in one OFDM symbol within neighboring OFDM symbols which does not contain the REs for transmitting the CSI-RS is larger than four; or configuring, by the sending terminal equipment, entirely remaining REs in one OFDM symbol as REs which do not constitute the REG in the OFDM symbol, when one physical resource block only contains the REs for transmitting the CSI-RS and a number of REs in the OFDM symbol within neighboring OFDM symbols which does not contain the REs for transmitting the CSI-RS is smaller than four; and wherein the configuring, by the sending terminal equipment, remaining REs in two neighboring OFDM symbols as the REG, wherein the two neighboring OFDM symbols that are contained in the physical resource block include REs for transmitting the CSI-RS and/or the DM-RS comprises:
  configuring every four REs in OFDM symbols whose number of REs is larger than four, by the sending terminal equipment, as one REG, when a number of REs in one OFDM symbol is larger than four and a number of REs in the other OFDM symbol is smaller than four within two neighboring OFDM symbols which contain the REs for transmitting the CSI-RS and/or the DM-RS in one physical resource block; and configuring four remaining REs in the two neighboring OFDM symbols, by the sending terminal equipment, as the REG and determining other remaining REs in the two neighboring OFDM symbols as remaining REs which do not constitute the REG in the two neighboring OFDM symbols, when a sum of a number of the remaining REs in the OFDM symbol whose number is larger than four after constituting the REG and a number of the remaining REs in the other OFDM symbol whose number is smaller than four is larger than four; or
  configuring every four REs in two neighboring OFDM symbols, by the sending terminal equipment, as one REG respectively, when each of numbers of REs in two neighboring OFDM symbols which contain REs for transmitting the CSI-RS and/or the DM-RS in one physical resource block is larger than four; and configuring four remaining REs in the two neighboring OFDM symbols, by the sending terminal equipment, as the REG and determining other remaining REs as remaining REs which do not constitute the REG in the two neighboring OFDM symbols, when a sum of remaining REs after constituting the REG in the two neighboring OFDM symbols is larger than four; or
  configuring four remaining REs in the two neighboring OFDM symbols, by the sending terminal equipment, as one REG and determining other remaining REs as the remaining REs which do not constitute the REG in the two neighboring OFDM symbols, when each of numbers of remaining REs in two neighboring OFDM symbols which contain REs for transmitting the CSI-RS and/or the DM-RS in one physical resource block is smaller than four, but a sum of the numbers of REs in the two neighboring OFDM symbols is larger than four.

2. The method as claimed in claim 1, wherein the discarding the remaining REs which do not constitute the REG in the OFDM symbol, by the sending terminal equipment for sending the backhaul link control channel information, and transmitting the backhaul link control channel information through the REG or discarding the REG comprises:
  discarding remaining REs which do not constitute the REG, by the sending terminal equipment, and transmitting the backhaul link control channel information through one or more REGs and/or discarding the one or more REGs, when there are a plurality of REGs constituted in one physical resource block by the sending terminal equipment.

3. A sending terminal equipment for transmitting backhaul link control channel information, comprising:
  a configuring module, which is used to configure remaining Resource Elements (REs) which are not occupied by a Channel State Information Reference Signal (CSI-RS) and/or a Demodulation Reference Signal (DM-RS) in an Orthogonal Frequency Division Multiplexing (OFDM) symbol as a Resource Element Group (REG), wherein the OFDM symbol contains REs for transmitting the CSI-RS and/or the DM-RS in a physical resource block; and
  a processing module, which is used to discard the remaining REs which do not constitute the REG in the OFDM symbol, and transmit the backhaul link control channel information through the REG or discarding the REG constituted by the configuring module,
  wherein the configuring module configures remaining REs in an OFDM symbol as the REG, wherein the OFDM symbol that is contained in a physical resource block only includes REs for transmitting the CSI-RS and neighboring OFDM symbols of the OFDM symbol do not include REs for transmitting the CSI-RS; and/or
  wherein the configuring module configures remaining REs in two neighboring OFDM symbols as the REG, wherein the two neighboring OFDM symbols that are contained in the physical resource block include REs for transmitting the CSI-RS and/or the DM-RS,
  wherein the configuring module is used to configure every four remaining REs as one REG, and determine other remaining REs as REs which do not constitute the REG, when one physical resource block only contains the REs for transmitting the CSI-RS and a number of remaining REs in one OFDM symbol within neighboring OFDM symbols which does not contain the REs for transmitting the CSI-RS is larger than four; or
  wherein the configuring module is used to configure entirely remaining REs in one OFDM symbol as REs which do not constitute the REG in the OFDM symbol, when one physical resource block only contains the REs for transmitting the CSI-RS and a number of REs in the OFDM symbol within neighboring OFDM symbols which does not contain the REs for transmitting the CSI-RS is smaller than four; or
  wherein the configuring module is used to configure every four REs in OFDM symbols whose number of REs is larger than four as one REG, when a number of REs in one OFDM symbol is larger than four and a number of REs in the other OFDM symbol is smaller than four within two neighboring OFDM symbols which contain the REs for transmitting the CSI-RS and/or the DM-RS in one physical resource block; and configure four remaining REs in the two neighboring OFDM symbols as the REG and determine other remaining REs in the two neighboring OFDM symbols as remaining REs which do not constitute the REG in the two neighboring OFDM symbols, when a sum of a number of the remaining REs in the OFDM symbol whose number is larger than four after constituting the REG and a number of the remaining REs in the other OFDM symbol whose number is smaller than four is larger than four; or
  wherein the configuring module is used to configure every four REs in two neighboring OFDM symbols as one REG respectively, when each of numbers of REs in two neighboring OFDM symbols which contain REs for transmitting the CSI-RS and/or the DM-RS in one physical resource block is larger than four; and configure four remaining REs in the two neighboring OFDM symbols as the REG and determine other remaining REs as remaining REs which do not constitute the REG in the two neighboring OFDM symbols, when a sum of remaining REs after constituting the REG in the two neighboring OFDM symbols is larger than four; or wherein the configuring module is used to configure four remaining REs in the two neighboring OFDM symbols as one REG and determine other remaining REs as the remaining REs which do not constitute the REG in the two neighboring OFDM symbols, when each of numbers of remaining REs in two neighboring OFDM symbols which contain REs for transmitting the CSI-RS and/or the DM-RS in one physical resource block is smaller than four, but a sum of the numbers of REs in the two neighboring OFDM symbols is larger than four.

4. The sending terminal equipment as claimed in claim 3, wherein
the processing module is used to discard remaining REs which do not constitute the REG in the OFDM symbol, and transmit the backhaul link control channel information through one or more REGs and/or discard the one or more REGs, when there are a plurality of REGs constituted in one physical resource block by the configuring module.

5. A method for resource allocation of backhaul link control channel information, comprising the following steps:
identifying a Resource Element Group (REG) in an Orthogonal Frequency Division Multiplexing (OFDM) symbol, by a receiving terminal equipment for receiving the backhaul link control channel information, wherein the OFDM symbol contains Resource Elements (REs) for transmitting a Channel State Information Reference Signal (CSI-RS) and/or a Demodulation Reference Signal (DM-RS) in a physical resource block; and
discarding receiving the backhaul link control channel information through the remaining REs which do not constitute the REG in the OFDM symbol, by the receiving terminal equipment for receiving the backhaul link control channel information, and receiving the backhaul link control channel information through the REG or discarding receiving the backhaul link control channel information through the REG,
wherein the identifying a Resource Element Group (REG) in an Orthogonal Frequency Division Multiplexing (OFDM) symbol, by a receiving terminal equipment for receiving the backhaul link control channel information comprises:
identifying, by the receiving terminal equipment, the REG in one OFDM symbol, wherein the OFDM symbol that is contained in a physical resource block only includes REs for transmitting the CSI-RS and neighboring OFDM symbols of the OFDM symbol do not include REs for transmitting the CSI-RS; and/or
identifying, by the receiving terminal equipment, the REG in two neighboring OFDM symbols, wherein the two neighboring OFDM symbols that are contained in the physical resource block include REs for transmitting the CSI-RS and/or the DM-RS,
wherein the identifying, by the receiving terminal equipment, the REG in one OFDM symbol, wherein the OFDM symbol that is contained in a physical resource block only includes REs for transmitting the CSI-RS and neighboring OFDM symbols of the OFDM symbol do not include REs for transmitting the CSI-RS comprises:
identifying, by the receiving terminal equipment, the REG constituted by every four remaining REs, and other remaining REs which do not constitute the REG, when one physical resource block only contains the REs for transmitting the CSI-RS and a number of remaining REs in one OFDM symbol within neighboring OFDM symbols which does not contain the REs for transmitting the CSI-RS is larger than four; or
identifying, by the receiving terminal equipment, entirely remaining REs in one OFDM symbol as REs which do not constitute the REG in the OFDM symbol, when one physical resource block only contains the REs for transmitting the CSI-RS and a number of REs in the OFDM symbol within neighboring OFDM symbols which does not contain the REs for transmitting the CSI-RS is smaller than four, and
wherein the identifying, by the receiving terminal equipment, the REG in two neighboring OFDM symbols comprises:
identifying, by the receiving terminal equipment, that every four REs in OFDM symbols whose number of REs is larger than four constitute one REG, when a number of REs in one OFDM symbol is larger than four and a number of REs in the other OFDM symbol is smaller than four within two neighboring OFDM symbols which contain the REs for transmitting the CSI-RS and/or the DM-RS in one physical resource block; and identifying, by the receiving terminal equipment, that four remaining REs in the two neighboring OFDM symbols constitute the REG and identifying other remaining REs in the two neighboring OFDM symbols as remaining REs which do not constitute the REG in the two neighboring OFDM symbols, when a sum of a number of the remaining REs in the OFDM symbol whose number is larger than four after constituting the REG and a number of the remaining REs in the other OFDM symbol whose number is smaller than four is larger than four; or
identifying, by the receiving terminal equipment, that every four REs in two neighboring OFDM symbols constitute one REG respectively, when each of numbers of REs in two neighboring OFDM symbols which contain REs for transmitting the CSI-RS and/or the DM-RS in one physical resource block is larger than four; and identifying, by the receiving terminal equipment, that four remaining REs in the two neighboring OFDM symbols constitute the REG and identifying other remaining REs as remaining REs which do not constitute the REG in the two neighboring OFDM symbols, when a sum of remaining REs after constituting the REG in the two neighboring OFDM symbols is larger than four; or
identifying, by the receiving terminal equipment, that four remaining REs in the two neighboring OFDM symbols constitute one REG and identifying other remaining REs as the remaining REs which do not constitute the REG in the two neighboring OFDM symbols, when each of numbers of remaining REs in two neighboring OFDM symbols which contain REs for transmitting the CSI-RS and/or the DM-RS in one physical resource block is smaller than four, but a sum of the numbers of REs in the two neighboring OFDM symbols is larger than four.

6. The method as claimed in claim 5, wherein the discarding receiving the backhaul link control channel information through the remaining REs which do not constitute the REG in the OFDM symbol, by the receiving terminal equipment for receiving the backhaul link control channel information, and receiving the backhaul link control channel information through the REG or discarding receiving the backhaul link control channel information through the REG comprises:

discarding receiving the backhaul link control channel information, by the receiving terminal equipment, through remaining REs which do not constitute the REG in the OFDM symbol, and receiving the backhaul link control channel information through one or more REGs and/or discarding receiving the backhaul link control channel information through the one or more REGs, when there are a plurality of REGs constituted in one physical resource block identified by the receiving terminal equipment.

7. A receiving terminal equipment for receiving backhaul link control channel information, comprising:
an identifying module, which is used to identify a Resource Element Group (REG) in an Orthogonal Frequency Division Multiplexing (OFDM) symbol, wherein the OFDM symbol contains Resource Elements (REs) for transmitting a Channel State Information Reference Signal (CSI-RS) and/or a Demodulation Reference Signal (DM-RS) in a physical resource block; and
a processing module, which is used to discard receiving the backhaul link control channel information through the remaining REs which do not constitute the REG in the OFDM symbol, and receive the backhaul link control channel information through the REG or discard receiving the backhaul link control channel information through the REG. identified by the identifying module,
wherein the identifying module is used to identify the REG in one OFDM symbol, wherein the OFDM symbol that is contained in a physical resource block only includes REs for transmitting the CSI-RS and neighboring OFDM symbols of the OFDM symbol do not include REs for transmitting the CSI-RS; and/or
wherein the identifying module is used to identify the REG in two neighboring OFDM symbols, wherein the two neighboring OFDM symbols that are contained in the physical resource block include REs for transmitting the CSI-RS and/or the DM-RS,
wherein the identifying module is used to identify the REG constituted by every four remaining REs, and other remaining REs which do not constitute the REG, when one physical resource block only contains the REs for transmitting the CSI-RS and a number of remaining REs in one OFDM symbol within neighboring OFDM symbols which does not contain the REs for transmitting the CSI-RS is larger than four; or
wherein the identifying module is used to identify entirely remaining REs in one OFDM symbol as REs which do not constitute the REG in the OFDM symbol, when one physical resource block only contains the REs for transmitting the CSI-RS and a number of REs in the OFDM symbol within neighboring OFDM symbols which does not contain the REs for transmitting the CSI-RS is smaller than four; or wherein the identifying module is used to identify that every four REs in OFDM symbols whose number of REs is larger than four constitute one REG, when a number of REs in one OFDM symbol is larger than four and a number of REs in the other OFDM symbol is smaller than four within two neighboring OFDM symbols which contain the REs for transmitting the CSI-RS and/or the DM-RS in one physical resource block; and identify that four remaining REs in the two neighboring OFDM symbols constitute the REG and identify other remaining REs in the two neighboring OFDM symbols as remaining REs which do not constitute the REG in the two neighboring OFDM symbols, when a sum of a number of the remaining REs in the OFDM symbol whose number is larger than four after constituting the REG and a number of the remaining REs in the other OFDM symbol whose number is smaller than four is larger than four; or
wherein the identifying module is used to identify that every four REs in two neighboring OFDM symbols constitute one REG respectively, when each of numbers of REs in two neighboring OFDM symbols which contain REs for transmitting the CSI-RS and/or the DM-RS in one physical resource block is larger than four; and identify that four remaining REs in the two neighboring OFDM symbols constitute the REG and identify other remaining REs as remaining REs which do not constitute the REG in the two neighboring OFDM symbols, when a sum of remaining REs after constituting the REG in the two neighboring OFDM symbols is larger than four; or
wherein the identifying module is used to identify that four remaining REs in the two neighboring OFDM symbols constitute one REG and identify other remaining REs as the remaining REs which do not constitute the REG in the two neighboring OFDM symbols, when each of numbers of remaining REs in two neighboring OFDM symbols which contain REs for transmitting the CSI-RS and/or the DM-RS in one physical resource block is smaller than four, but a sum of the numbers of REs in the two neighboring OFDM symbols is larger than four.

8. The receiving terminal equipment as claimed in claim 7, wherein
the processing module is used to discard receiving the backhaul link control channel information through remaining REs which do not constitute the REG in the OFDM symbol, and receive the backhaul link control channel information through one or more REGs and/or discard receiving the backhaul link control channel information through the one or more REGs, when there are a plurality of REGs constituted in one physical resource block identified by the identifying module.

* * * * *